United States Patent [19]
Yamamoto et al.

[11] Patent Number: 4,884,859
[45] Date of Patent: Dec. 5, 1989

[54] OPTICAL ATTENUATOR AND MANUFACTURING METHOD FOR MAKING SAME

[75] Inventors: Hiroyoshi Yamamoto; Toshiharu Takesue; Naoki Kawawada, all of Tokyo, Japan

[73] Assignee: Seiko Instruments Inc., Japan

[21] Appl. No.: 232,442

[22] Filed: Aug. 15, 1988

[30] Foreign Application Priority Data

Aug. 21, 1987 [JP] Japan .................. 62-207517

[51] Int. Cl.$^4$ .................. G02B 6/26; C03B 37/025
[52] U.S. Cl. .................. 350/96.15; 350/96.10; 350/96.29; 350/320; 65/2; 65/4.2; 65/10.1; 65/12
[58] Field of Search .............. 350/96.10, 96.15, 96.20, 350/96.21, 96.29, 320; 65/2, 4.1, 4.2, 10.1, 12

[56] References Cited

U.S. PATENT DOCUMENTS

| 4,557,556 | 12/1985 | Decker, Jr. .................. 350/96.21 |
| 4,557,557 | 12/1985 | Gleason et al. .................. 350/96.21 |
| 4,584,464 | 4/1986 | Myer .................. 65/12 X |
| 4,697,869 | 10/1987 | So et al. .................. 350/96.15 |
| 4,721,351 | 1/1988 | Goepfert et al. .................. 350/96.15 |
| 4,728,170 | 3/1988 | Robertson .................. 350/96.15 |
| 4,803,353 | 2/1989 | Moorehead .................. 350/96.21 X |
| 4,804,248 | 2/1989 | Bhagavatula .................. 350/96.15 |

Primary Examiner—William L. Sikes
Assistant Examiner—Brian M. Healy
Attorney, Agent, or Firm—Bruce L. Adams; Van C. Wilks

[57] ABSTRACT

A simple method of manufacturing optical attenuators comprises heating a part of an optical fiber composed of a core and a cladding to a temperature around the softening point of the materials of the optical fiber and applying a tension and/or a twist to the optical fiber at a predetermined speed to form an optical attenuation area having fine cracks in the heated part of the optical fiber.

14 Claims, 2 Drawing Sheets

OPTICAL ATTENUATOR AND MANUFACTURING METHOD FOR MAKING SAME

FIELD OF THE INVENTION

The present invention relates to devices for optical communication systems, and more particularly to optical attenuators which attenuate incident light at a predetermined rate of attenuation. The present invention also relates to a method of manfucturing such an optical attenuator.

BACKGROUND OF THE INVENTION

As shown in FIG. 2, a conventional optical attenuator comprises an optical system enclosed in a case 23 which is constructed with optical elements such as spherical lenses an an ND filter. Since the conventional optical attenuator has to be constructed with a combination of many optical elements, it was difficult heretofore to reduce the cost and the size of the system. Further, high manufacturing and adjustment accuracy is required for the construction of the optical system. Moreover, since the optical elements have to be cemented or mechanically bound to set up the optical system, the prior type of system not has not highly reliable from the view point of temperature characteristics and shock-resistance.

SUMMARY OF THE INVENTION

An object of the invention is to provide a method for manufacturing optical attenuators having a desired attenuation. According to the manufacturing method of the present invention, a portion of an optical fiber is heated to a temperature around the softening point while an external force, i.e., tension and/or twist is simultaneously applied to the optical fiber so that fine cracks are generated in the heated portion of the optical fiber. By this method, the resulting attenuation rate of the fiber can easily be controlled by the time duration of the fiber heating.

DESCRIPTION OF THE PREFERRED EMBODIMENTS

Figure 3:
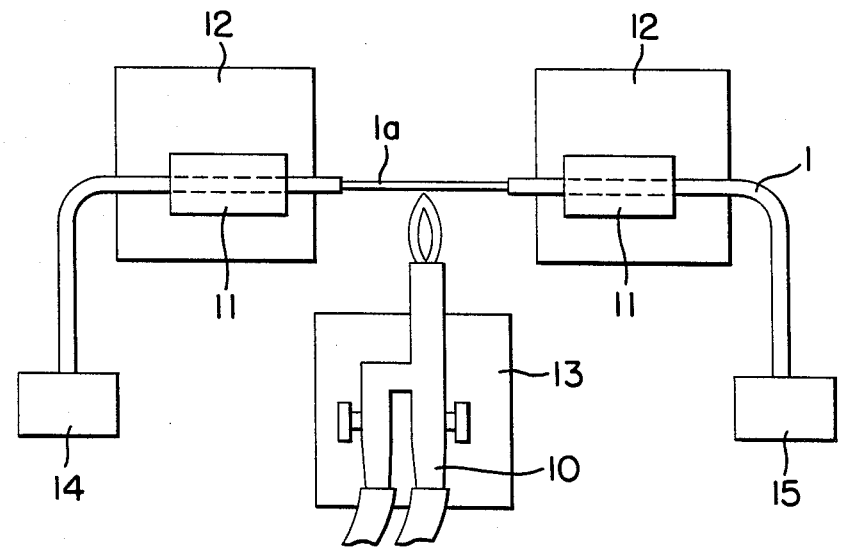
FIG. 3 is a schematic view of an apparatus for manufacturing optical attenuators according to the present invention.
Figure 4:
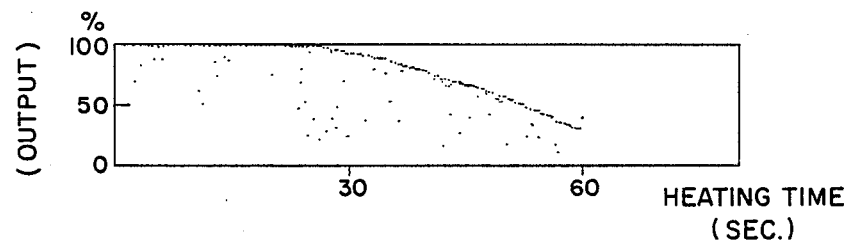
FIG. 4 shows the relationship between the time duration of heating and the attenuation of light.

The present invention is below described with reference to the accompanying drawings. As shown in FIG. 3, a part of the cover of an optical transmission line 1 is removed by a solution or the like and the optical fiber 1a is exposed. A part of the exposed optical fiber 1a is subjected to heat, for example, from burner 10, and the transmission line 1 is fixed with clamps 11. One end of the transmission line 1 is connected to a light source 14 and the other end to an optical receptor unit 15. After the optical fiber 1a is heated by the burner to a temperature around the softening point, a mobile stage 12 with the clamp 11 fixed thereto is shifted along the axis of the optical fiber at a speed of 10 $\mu$m/sec. to 100 $\mu$m/sec. in order to apply a tension to the fiber portion 1a. As fine cracks are increasingly generated at the fiber portion 1a, the loss of the transmitted light increases. When the light detected at the optical receptor unit 15 reaches a desired attenuation, the movement of the tension applying stage 12 is stopped and the burner 10 which is preferably carried on a mobile stage 13, is moved away from the optical fiber. When an attenuator is manufactured in a quartz ($SiO_2$) fiber according to this method at a heating temperature of 800 ° C. with a tension applied at a rate of 80 $\mu$m/sec., the loss of light during transmission increases with the increase of heating time as shown in FIG. 4. According to the method of the present invention, attenuation or loss of light can easily be controlled by heating time.

Figure 5:
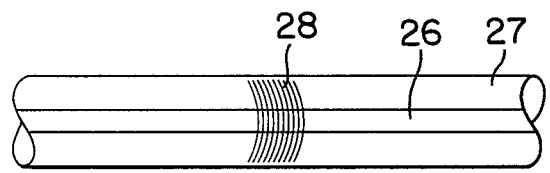
FIG. 5 shows cracks formed in an optical attenuator according to the present invention.

FIG. 5 shows cracks 28 formed in an optical attenuator of the present invention. The optical fiber is composed of a core 26 and has a cladding 27. Cracks 28, appear in the cladding and the attenuation or loss of light occurs at the cracks.

Figure 1:
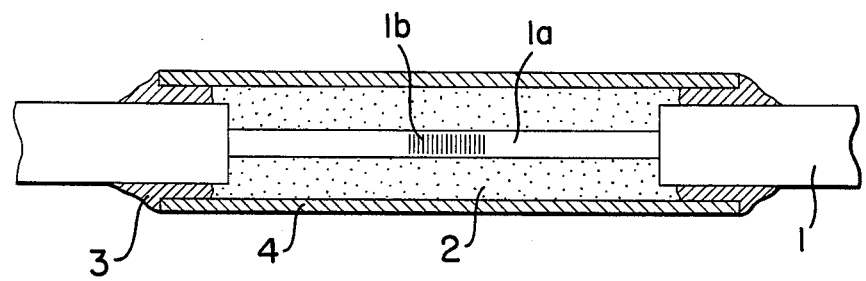
FIG.1 shows in cross section an embodiment of an optical attenuators according to the present invention.
Figure 2:
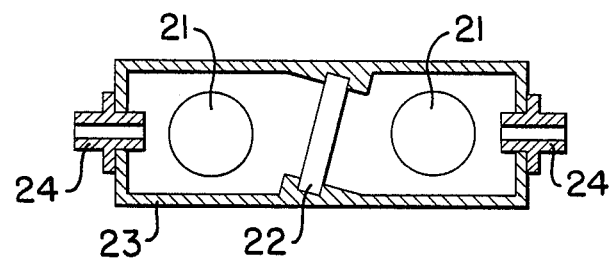
FIG.2 is a sectional view of a conventional optical attenuator.

An optical fiber having an optical attenuator is protected in the manner as shown in FIG. 1. The optical transmission line 1 is cemented to a case 4 with adhesive 3. In order to further protect the optical fiber portion 1a, the case is filled with a filler material 2. The filler 2 has to be soft enough so as not to damage the optical fiber portion 1a, and should have a refractive index lower than that of the cladding of the optical fiber. Silicon gel would be suitable in this respect.

Figure 6:
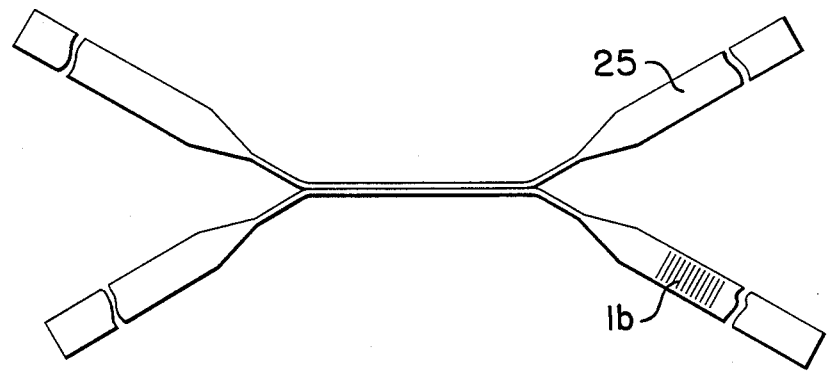
FIG. 6 shows an example in which an optical attenuator of the present invention is incorporated into a fused taper optical fiber coupler.

Optical attenuators manufactured according to the present invention can be combined with other optical devices. FIG. 6 shows an example of the application of an optical attenuator 1b fabricated according to the manufacturing method of the present invention to a fused taper optical fiber coupler 25. The apparatus for manufacturing fused taper optical fiber couplers is almost identical with the apparatus for manufacturing optical attenuators.

Therefore, an optical element having the combined functions of an optical fiber coupler and an optical attenuator can be obtained in one apparatus.

According to the present invention, a small optical attenuator can be obtained at low cost because optical elements such as spherical lenses, ND filters, etc. are not required, nor are adjustments of these elements needed. Further, since an optical attenuator of the present invention is provided directly in an optical fiber, the reliability in terms of temperature characteristic and shock-resistance is high.

We claim:

1. A method of manufacturing optical attenuators comprising the steps of:
   heating a part of an optical fiber composed of a core and a cladding to a temperature around the softening point thereof; and applying an external force at a predetermined speed to said optical fiber for generating fine cracks around the cladding to induce radiation loss therefrom, thereby forming an optical attenuation area in the heated part of said optical fiber.

2. The method of manufacturing optical attenuators according to claim 1, wherein said step of applying external force comprises applying tension to said fiber in the direction of the longitudinal axis thereof.

3. The method of manufacturing optical attenuators according to claim 1, wherein said heating is carried out with a burner.

4. An optical attenuator comprising:
   an optical fiber composed of a core and a cladding; and an optical attenuation portion of said optical fiber, said optical attenuation portion consisting of a plurality of radial cracks in the cladding to induce radiation loss from said core.

5. A method of manufacturing optical attenuators, comprising the steps of:
   heating a part of an optical fiber composed of a core and a cladding to a temperature around the softening point of the materials of said optical fiber; and
   applying a twisting force to said optical fiber around the longitudinal axis thereof at a predetermined speed to form an optical attenuation area in the heated part of said optical fiber.

6. Apparatus for producing optical attenuators, comprising:
   means for heating a portion of an optical fiber composed of a core and a cladding around the core to a predetermined temperature; and
   means for placing said optical fiber under predetermined tension sufficient to produce radial cracks in said cladding after said optical fiber has been heated to said predetermined temperature, thereby to induce radiation loss from said optical fiber.

7. The apparatus of claim 6, in which said predetermined temperature is approximately the softening point of said optical fiber.

8. The apparatus of claim 6, in which said means for placing said optical fiber under tension comprises means for inducing predetermined angular displacement in said optical fiber.

9. The apparatus of claim 8, comprising, in addition, means for monitoring the radiation loss induced in said optical fiber, and for terminating both said angular displacement and said heat when said radiation loss reaches a predetermined level.

10. The apparatus of claim 6, in which said means for applying heat to said optical fiber comprises a burner.

11. The attenuator of claim 4, in which said optical fiber comprises quartz.

12. The apparatus of claim 7, in which the optical fiber is quartz and said predetermined temperature is approximately 800° C.

13. The attenuator of claim 4, comprising, in addition, an encasement material surrounding said optical fiber and having a refractive index lower than that of said cladding.

14. The attenuator of claim 13, in which said encasement material comprises silicon gel.

* * * * *